(12) United States Patent  
Nutaro et al.

(10) Patent No.: US 9,135,916 B2
(45) Date of Patent: Sep. 15, 2015

(54) SYSTEM AND METHOD FOR CORRECTING ACCENT INDUCED SPEECH TRANSMISSION PROBLEMS

(71) Applicant: HONEYWELL INTERNATIONAL INC., Morristown, NJ (US)

(72) Inventors: Joseph Nutaro, Phoenix, AZ (US); Robert E. De Mers, Nowthen, MN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 223 days.

(21) Appl. No.: 13/777,138

(22) Filed: Feb. 26, 2013

(65) Prior Publication Data

US 2014/0244246 A1 Aug. 28, 2014

(51) Int. Cl.

| | |
|---|---|
| G10L 15/26 | (2006.01) |
| G10L 19/005 | (2013.01) |
| G10L 15/32 | (2013.01) |
| G10L 15/22 | (2006.01) |
| G10L 13/00 | (2006.01) |
| G08G 5/00 | (2006.01) |

(52) U.S. Cl.
CPC ............. *G10L 15/26* (2013.01); *G10L 15/32* (2013.01); *G08G 5/0013* (2013.01); *G10L 13/00* (2013.01); *G10L 2015/221* (2013.01)

(58) Field of Classification Search
CPC ........ G10L 15/26; G10L 15/03; G10L 19/005
USPC .................................................. 704/226, 258
See application file for complete search history.

(56) References Cited

U.S. PATENT DOCUMENTS

| 7,412,387 B2 | 8/2008 | Faisman et al. |
|---|---|---|
| 7,853,555 B2 | 12/2010 | Peoples et al. |
| 8,036,893 B2 | 10/2011 | Reich |
| 8,219,398 B2 | 7/2012 | Marple et al. |
| 8,234,121 B1 | 7/2012 | Swearingen |
| 2002/0087311 A1 | 7/2002 | Leung Lee et al. |
| 2004/0162727 A1 | 8/2004 | Kiuchi et al. |
| 2006/0190260 A1 | 8/2006 | Iso-Sipila |
| 2007/0033032 A1 | 2/2007 | Schubert et al. |
| 2007/0038455 A1 | 2/2007 | Murzina et al. |
| 2007/0255570 A1 | 11/2007 | Annaz et al. |

(Continued)

FOREIGN PATENT DOCUMENTS

GB 2338369 A 12/1999

OTHER PUBLICATIONS

Prinzo, V. et al.: "U.S. Airline Transport Pilot International Flight Language Experiences, Report 3: Language Experiences in Non-Native English-Speaking Airspace/Airports" Final Report by FAA Civil Aerospace Medical Institute (Oklahoma City, OK)—Report No. DOT/FAA/AM-10/9, May 2010.

(Continued)

*Primary Examiner* — Qian Yang
(74) *Attorney, Agent, or Firm* — Ingrassia Fisher & Lorenz, PC

(57) ABSTRACT

A system and method is provided for detecting errors in a speech transmission system. A first audio stream is comprised of a plurality of words, upon which a plurality of independent voice-to-text conversions are performed. If it is determined that at least one of the plurality of independent voice-to-text conversions is error free, a text-to-voice conversion of the at least one error-free voice-to-text conversion is performed to create a second audio stream.

9 Claims, 5 Drawing Sheets

(56) References Cited

U.S. PATENT DOCUMENTS

| | | |
|---|---|---|
| 2010/0105015 A1 | 4/2010 | Ravin et al. |
| 2011/0022386 A1 | 1/2011 | Gatzke et al. |
| 2011/0125499 A1 | 5/2011 | Griggs et al. |

OTHER PUBLICATIONS

EP Search Report for Application No. 14154217.5, dated Jun. 2, 2014.

EP Examination Report for Application No. 14154217.5, dated Jul. 8, 2014.

EP Examination Report for Application No. 14154217.5, dated Mar. 3, 2015.

SYSTEM AND METHOD FOR CORRECTING ACCENT INDUCED SPEECH TRANSMISSION PROBLEMS

FIELD OF THE INVENTION

Embodiments disclosed herein relate generally to the processing of verbal communications and, more particularly, to a speech transmission system for reducing accent-induced anomalies in air-to-ground, ground-to-air, and air-to-air communications.

BACKGROUND

It is well known that human speech is being increasingly used as input data, and commands, and other information in order to electronically conduct transactions, send and receive information, and provide command and control. With the above in mind, it is also known that the airline and avionics industries operate in a global environment where oftentimes parties must communicate verbally in a language that is not the party's primary or native language. The accuracy of the communication depends on how well each of the speakers articulates each of the words he or she has spoken, which may depend on whether, and to what extent, he or she speaks with an accent; e.g. when the speaker is speaking in a non-native language. If the speaker's accent is severe, communications between, for example, neighboring aircraft, air traffic control (ATC) and landing or departing aircraft, etc. may be problematic. In fact, roughly sixty-five percent of pilots who fly internationally report difficulties communicating with air traffic control due to the air traffic controller's accent when speaking English.

This problem is ubiquitous among controllers in many countries, notwithstanding that seventy-five percent of communicators use ICAO (International Civil Aviation Organization) standard phraseology. Thus, translation is not the problem. Rather, the problems are associated with accent, pitch, pronunciation, and bitrate. Such communication problems impair a pilot's ability to understand and follow instructions, requiring significantly more effort and concentration.

One solution involves the use of a voice-to-text application followed by a text-to-voice application; however, such an approach, even when used in conjunction with a limited vocabulary (such as that used in control tower/aircraft communications) may result in inaccuracies.

In view of the foregoing, it would be desirable to provide a system and method for generating, transmitting, and receiving substantially error-free communications in environments requiring a high degree of accuracy.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In accordance with an embodiment, there is provided a method for detecting errors in a speech transmission system. A first audio stream comprised of a plurality of words is received, and a plurality of independent voice-to-text conversions of the audio is performed. Next, it is determined if at least one of the plurality of independent voice-to-text conversions is error free. A text-to-voice conversion of the at least one error-free voice-to-text conversion is performed to create a second audio stream.

In accordance with a further embodiment, there is provided a speech transmission system comprising a voice-to-text converter system having a plurality of voice-to-text converter channels, each converter for receiving and converting the same stream of spoken words into a text stream, and replacing comparison errors with error codes. A processor is configured to (1) select a text stream for conversion to voice; and (2) replace error codes with spoken words; and a text-to-voice converter is provided for converting the selected text stream to voice.

In accordance with a still further embodiment there is provided a method for transmitting a plurality of words, comprising performing first and second voice-to-text conversions of the plurality of words in first and second voice-to-text converters utilizing first and second different conversion algorithms, respectively, to produce first and second text streams, respectively. Words not recognized in the first and second voice-to-text conversions, if any, are replaced with first and second error codes respectively to form the first and second text streams, respectively. The first and second text streams are compared, and words that do not compare, if any, are replaced with a third error code to form a third text stream. Error codes are replaced with original audio. The third text steam is converted to voice, and transmitted with original audio, if any, to a receiver.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Although not always required, the techniques and technologies described here are suitable for use by any aircraft, ground control system, or other communication system.

Figure 1:
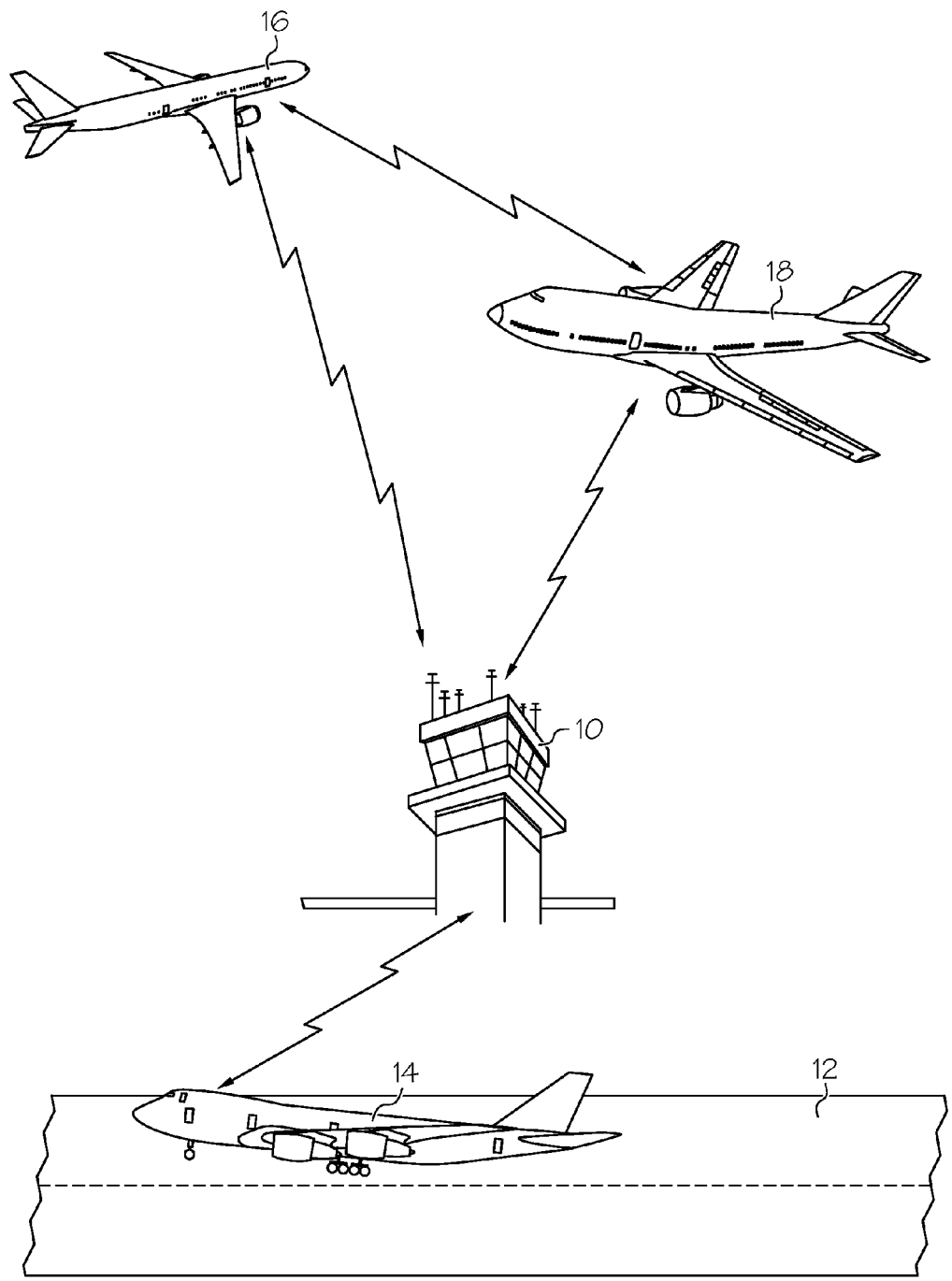
FIG. 1 is a three dimensional view of an airport, surrounding airborne traffic, and departing and/or arriving aircraft traffic.

FIG. 1 is a three-dimensional view of an airport and the airspace therearound including an air traffic control (ATC) tower 10, a runway 12, and an aircraft 14 landing on or departing from runway 12. As can be seen, aircraft 14 is in communication with ATC tower 10, as are airborne aircraft 16 and 18. Aircraft 16 and 18 are also in communication with each other. FIG. 1 is intended to demonstrate the myriad of radio communication modes that may exist between pilots, crew, and air traffic controllers. As referred to above, errors and delays may be created if one or both parties to a communication incorrectly interpret what is being said. The problem is exacerbated in crowded metropolitan areas where airports deal with dense air traffic.

It is thus contemplated herein to provide a method and apparatus for converting speech to text by at least two independent means (e.g. different algorithms) and comparing the result. If identical, the text may be converted to voice and transmitted. If not identical, then the original words from the speaker will be substituted for any words that do not compare. It is further contemplated that this will occur only rarely and will not represent a major annoyance. If failures to compare occur often, it may represent a flag that the speaker needs more training. It is still further contemplated that the method and apparatus may be employed by either party or both parties to a conversation.

Figure 2:
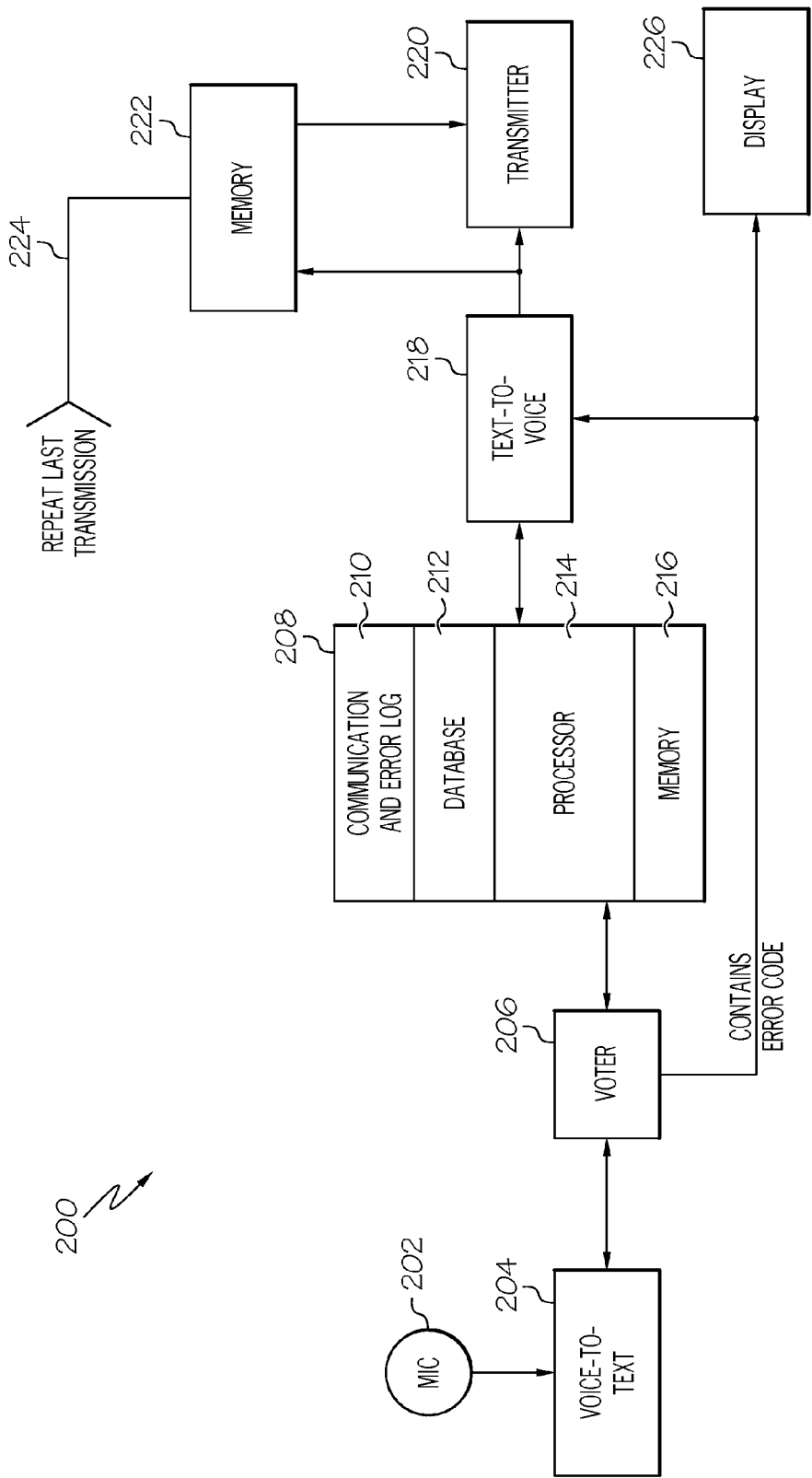
FIG. 2 is a block diagram of a system for correcting speech transmission errors in accordance with an embodiment.

FIG. 2 is a functional block diagram of a system 200 for reducing speech accent and transmitting corrected voice. A number of words spoken into microphone 202 are provided to voice-to-text converter 204 which converts the spoken words to text in accordance with known technology. The number of words processed in each cycle will depend on the quality and speed of the voice converters in voice-to-text converter 204. It is contemplated that three to five words may be converted to text in each cycle. This represents a compromise between computational ability and the perceived lag in speech. Furthermore, the length of each word cycle may be adjustable depending on the desired speech delay tolerance and the computational abilities of the system's hardware and software.

Voice-to-text converter 204 contains a plurality of voice-to-text conversion channels, each of which receives the same word packet for conversion. The text produced in each channel is then analyzed by voter 206 so as compare the channels to each other and determine if the conversions to text are acceptable. A selected text stream is then sent to a processor 208 comparison with the words in an inappropriate word database 212. Processor 208 also includes a communications and error log 210 that is useful for later analysis. Processor 208 also includes standard processing and memory architecture 214 and 216. The text may be screened for words that do not fall within a predefined vocabulary (ignoring error codes for now). That is, in applications requiring a high degree of accuracy such as communications between an aircraft and a control tower, a defined vocabulary is used to avoid misunderstandings. A speaker might use specific words to communicate identity (e.g. the identity "KA5" should be communicated as "kilo alpha fiver" as opposed to "kitten apple five"). The inappropriate words database 212 should contain the words "kitten," "apple," and "five." It is contemplated that this database will be updated frequently to provide a complete list of commonly used inappropriate words. When inappropriate words are used, they may be stored in memory. Even the sound of clearing one's throat may be contained in the inappropriate words database and replaced with silence. If desired, processor 208 may be configured to replace the inappropriate word with the correct word. In other cases, the inappropriate may be allowed to pass through but will be logged for subsequent review. Alternatively, processor 208 may be configured to store in memory a list of all words in an approved vocabulary. Any words not in the list may be logged.

The text is next checked for error codes, described below in connection with FIG. 3. If there are no error codes, the text is passed to the text-to-voice converter 218, which converts the text back to speech using existing technology. The characteristics of the voice are selected to achieve the optimum understanding (e.g. mid-western) and for transmission in the appropriate transmission medium (e.g. audio frequency range for radio).

If, however, error codes are detected, the error codes are replaced by the original saved digitized audio of the speaker's words. This may be accomplished by simply counting the word position in the word string replaced by the error code and matching it up with the same word position in the digitized audio. The null between words in the digitized audio may be used to count the words and detect the appropriate word location. Text-to-voice converter 218 may be interrupted to replace the error code with the digitized audio word and then return to complete the conversion to speech.

The final speech is sent to a transmitting device 220 over an appropriate interface device. For example, if the entire speech generator system is separate from the radio, a digitized audio-to-transmitter (e.g. radio or telephone) over Ethernet may be appropriate. Alternatively, the text may be sent to the receiver where the text-to-voice conversion takes place.

The final text can be saved in a continuous log in memory 222 to provide a transcript. Alternatively, the last speech sent to transmitter 220 can be stored in speech memory 222 to be resent upon a Repeat Last Transmission command 224 from the speaker or listener. The length of the saved transmission may be adjustable by, for example, the number of words on cycles. If desired, a display 226 can be provided to display the digital text if the text is transmitted with or as an alternative to voice.

It should be understood that blocks shown in FIG. 2 are functional in nature and, where applicable, the functions may be performed by one or more special purpose or general purpose processors.

Figure 3:
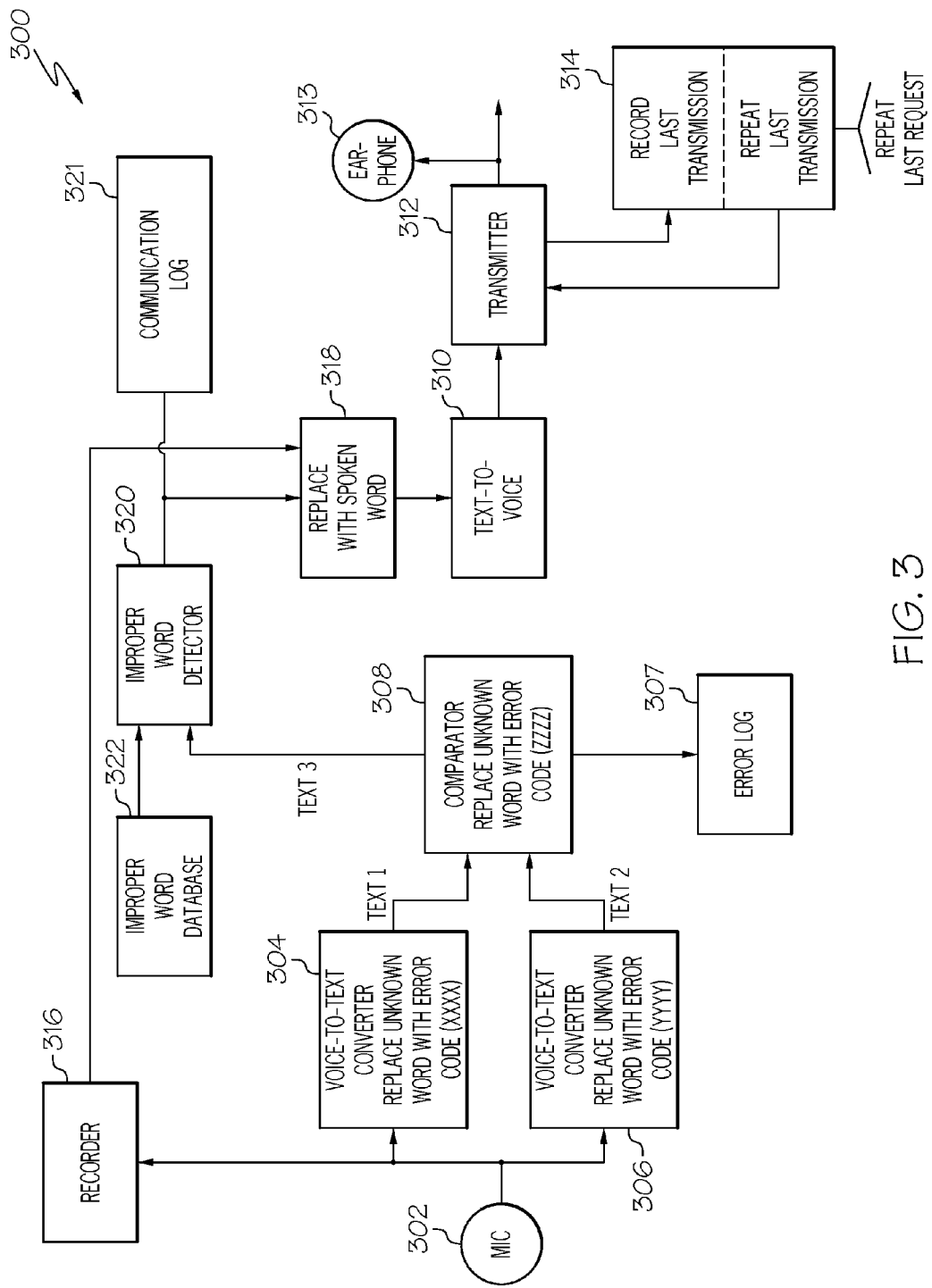
FIG. 3 is a block diagram of a system for correcting speech recognition errors in accordance with a further embodiment.

FIG. 3 is a block diagram of a system 300 for correcting accents and transmitting corrected speech in accordance with a further embodiment. In this embodiment, a microphone 302 is coupled to the input of first and second voice-to-text converters 304 and 306, respectively. If a word is not recognized in either of converters 304 or 306, a unique error code is inserted into the text replacing the word that was not recognized. For example, in voice-to-text converter 304, an unrecognized word may be replaced with error code XXXX, whereas an unrecognized word in voice-to-text converter 306 may be replaced with error code YYYY; i. e. a word not recognized with a sufficiently high confidence level. For example, each converter may provide recognition on a correctness scale of zero to 100%, and anything below 95% might be considered unrecognizable.

The output of voice-to-text converter 304 (Text 1) and the output of voice-to-text converter 306 (Text 2) are compared in a comparator 308. If they compare, either Text 1 or Text 2 (Text 3) will be passed on to detector 320, which searches Text 3 for improper words contained in database 322. If a word is found to be improper, a proper word from the database may be substituted for the text word in block 320 and forwarded to text to voice converter 310, which performs the conversion and passes the voice on to transmitter 312. Alternatively, the original text word may be passed on, and the improper word logged for later analysis.

There are situations where the original spoken word stored in recorder 316 may be sent to transmitter 312; e.g. if Text 1 from voice-to-text converter 304 does not compare with Text 2 from voice-to-text converter 306. This may be due to an error code being inserted into Text 1 and/or Text 2, or words being identified by the respective converters with high confidence but which simply don't compare. In this case, a word not recognized is replaced with an error code ZZZZ (Text 3) and applied to block 318 where the original spoken word is substituted for the error code prior to transmission from text-to-voice converter 310. In this manner, the original spoken word may be positioned in its proper place in the word stream supplied by converter 310 to transmitter 312. The output of transmitter 312 may be coupled to an earphone 313 or other transducer (e.g. a speaker or radio transmitter) and to a recorder 314 for recording the last transmission and repeating the last transmission upon request.

Figure 4:
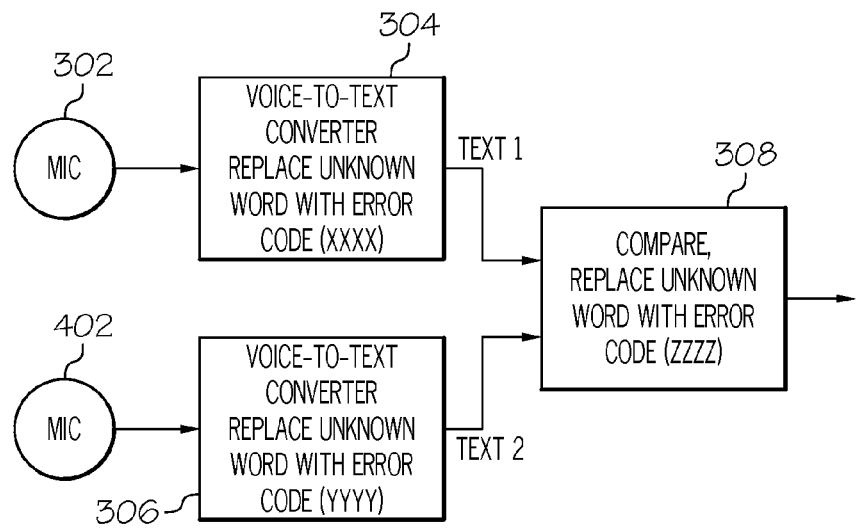
FIG. 4 is a block diagram illustrating how the integrity of the system may be increased in accordance with an embodiment.
Figure 5:
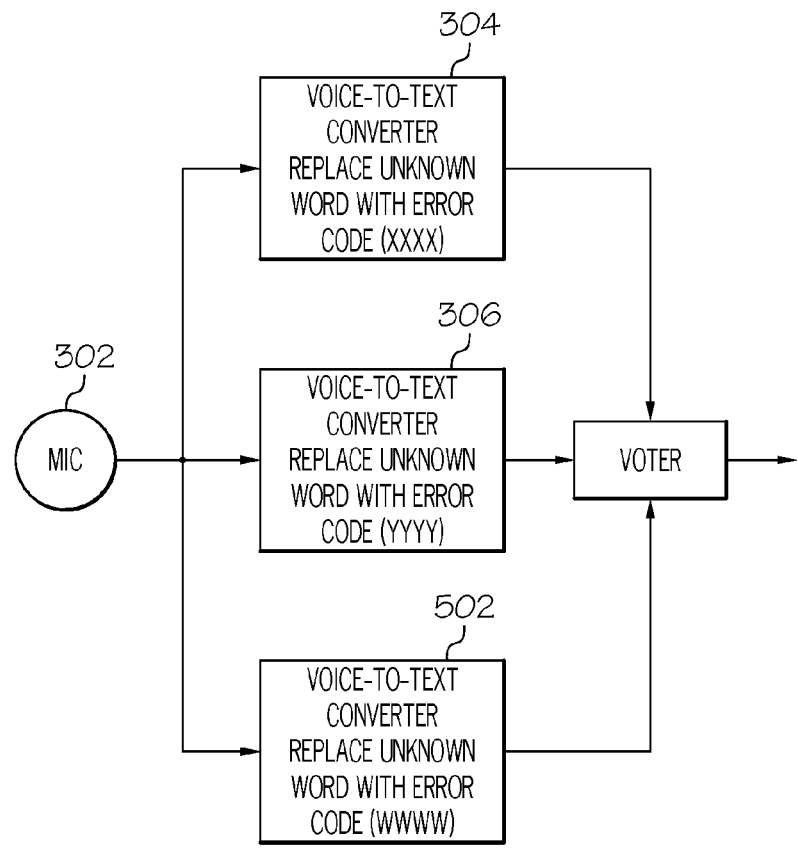
FIG. 5 is a block diagram illustrating how the integrity of the system may be increased in accordance with a further embodiment.

To increase the integrity of the system, the conversion algorithms in each of converters 304 and 306 are preferably different. Furthermore, if desired, two microphones 302 and 402 may be provided, the first microphone 302 coupled to the input of voice-to-text converter 304 and a second microphone 402 coupled to input of voice-to-text 306 as shown in FIG. 4. This would also increase the integrity of the system. Alternatively, as shown in FIG. 5, microphone 302 may be coupled to the input of an additional voice-to-text converter 502 in addition to voice-to-text converters 304 and 306. A voter 504 receives the output of voice-to-text converters 304, 306, and 502 and first compares the output of voice-to-text converter 304 to that of voice-to-text converter 306. If they compare, the output of either converter 304 or 306 is forwarded. If there is no comparison, the output of converter 304 is compared to that of 502. If there is a comparison, the output of either voter 304 or 502 is forwarded. If there is no comparison, the output of converter 306 is compared with that of converter 502. If there is a comparison, the output of either converter 306 or 502 is forwarded. If there is no comparison, the voter sends Text 3 with error code ZZZZ as previously described.

Referring once again to FIG. 3, each of the voice-to-text converters is provided with a unique error code that operates as follows. Assume a tower speaker orders:
  "501 descend flight level 60".
Converter 304 detects an error and outputs:
  "501 descend XXXX level 60"
and converter 306 detects no error and outputs:
  "501 descend flight level 60".
Both outputs are provided to converter 308 and do not compare. Therefore, the output of converter 308 is:
  "501 descend ZZZZ level 60".
Alternatively, in the next example, converter 304 detects an error and outputs:
  "501 descend XXX level 60"
and converter 306 detects an error and outputs:
  "501 descend flight YYYY 60".
Both are provided to converter 308 and do not compare, and converter 308 outputs:
  "501 descend ZZZZ ZZZZ 60".
In the next example, converters 304 and 306 detect the same error. That is, converter 304 detects an error and outputs:
  "501 descend XXXX level 60"
and converter 306 detects an error and outputs:
  "501 descend YYYY level 60".
These outputs do not compare in converter 308, and converter 308 outputs:
  "501 descend ZZZZ level 60".

Figure 6:
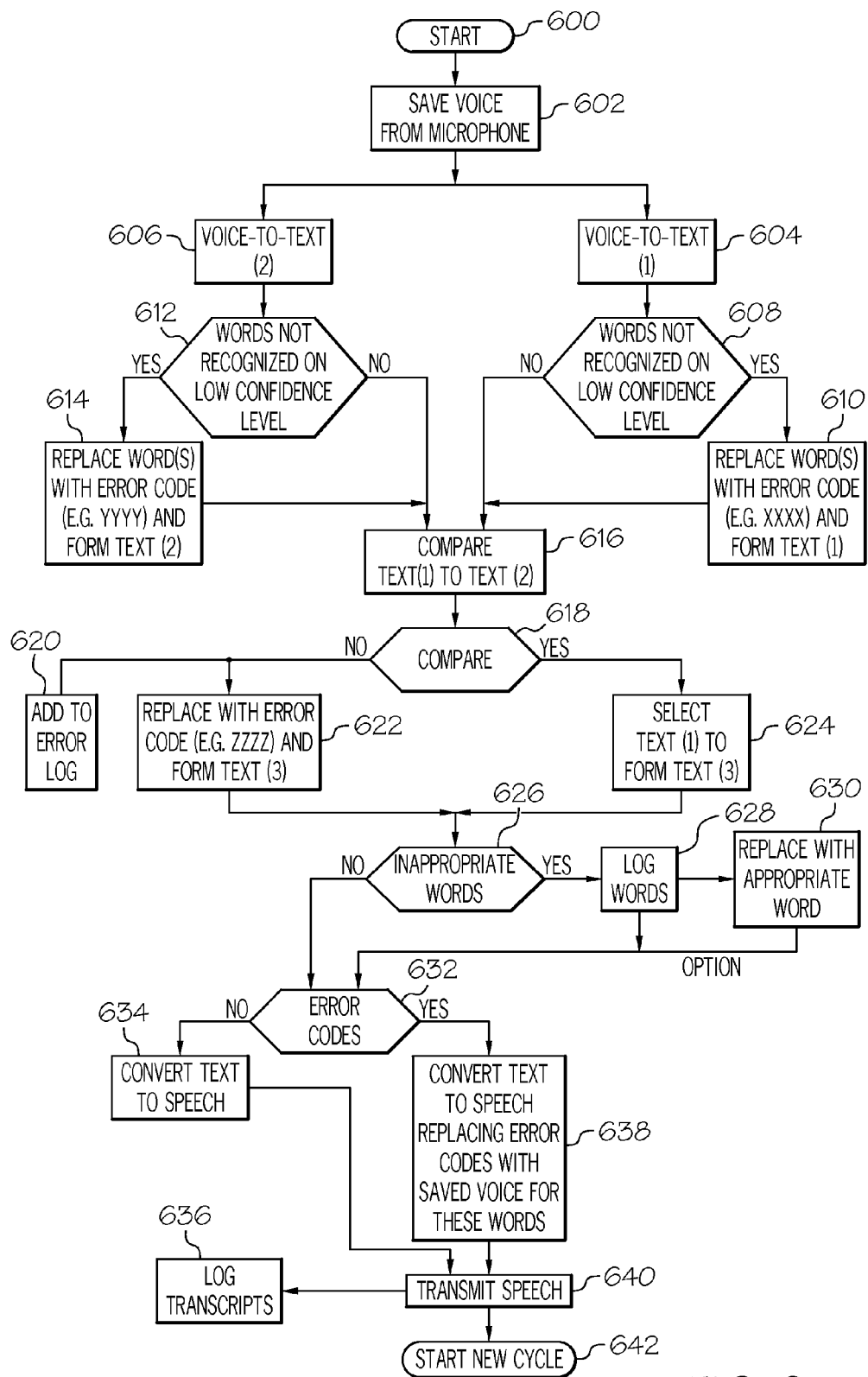
FIG. 6 is a flow chart of a method for correcting speech recognition errors in accordance with an embodiment.

FIG. 6 is a flowchart illustrating a method 600 for reducing speech transmission (e.g. accent) errors. In STEP 602, the same segment of voice is converted to text producing first and second text channels (STEPS 604 and 606). If a word in the segment of digitized speech in the first text channel is not recognizable or is otherwise possessed of a low confidence level (STEP 608) the word is replaced with an error code (e.g. XXXX) in the text (STEP 610). Similarly, if a word in the segment of digitized speech in the second text channel is not recognizable or is otherwise possessed of a low confidence level (STEP 612), the word is replaced with an error code (e.g. YYYY) in the text (STEP 614). After the substitution of error codes (XXXX, YYYY) in the STEPS 610 and 614, if necessary, the modified text resulting from STEPS 610 and 614 is compared (STEP 616). If the words in the first and second strings compare, the process proceeds directly to STEP 624.

If, at this point, Text 1 and Text 2 do not compare (STEP 618), the non-compared texts are added to an error log (STEP 620), and the non-compare is replaced with a different error code (e.g. ZZZZ) (STEP 622) to form Text 3.

If, however, Text 1 and Text 2 do compare (STEP 618), either Text 1 or Text 2 is selected as Text 3 (STEP 624). Text 3 is then checked for inappropriate words. If an inappropriate word is found (STEP 626), the inappropriate word is logged (STEP 628) and, if desired, replaced with an appropriate word (STEP 630).

If there are no inappropriate words, the text is examined for error codes (STEP 632). If none are found, the text is converted to speech (STEP 634), logged (STEP 636) and transmitted (STEP 640). If error codes are found, the text is converted to speech replacing the error codes with saved voice (STEP 638). In either event, the speech is transmitted (STEP 640) and a new cycle started (STEP 642).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for detecting errors in a speech transmission system, the method comprising:
    receiving a first audio stream comprised of a plurality of words having an order;
    generating digitized audio by recording the first audio stream;
    performing at least two independent voice-to-text conversions of the audio stream thereby generating a first and a second text version of the plurality of words;
    comparing each word of the plurality of words in the first and second text versions, respectively, thereby generating (i) a first set of words comprising words for which the first and second text versions are identical and (ii) a second set of words comprising words for which the first and second text versions differ;
    performing a text-to-voice conversion of the first set of words;
    identifying parts of the digitized audio corresponding to the words of the second set of words; and
    creating a second audio stream comprising (i) the text-to-voice converted first set of words and (ii) the parts of the digitized audio corresponding to the words of the second set of words, such that words in the second audio stream have the same order as the plurality of words in the first audio stream.

2. The method of claim 1 further comprising transmitting the second audio stream to a receiver.

3. The method of claim 2, further comprising transmitting a text version to a display.

4. The method of claim 1, further comprising comparing each of the words in the first and second set of words with a database of improper words.

5. The method of claim 1, further comprising:
    replacing non-recognizable words in the first text version with a first error code to produce a first text stream; and
    replacing non-recognizable words in the second text version with a second error code to produce a second text stream.

6. The method of claim 5, further comprising selecting one of the first text stream and the second text stream as a third text stream for conversion to voice.

7. The method of claim 6, further comprising:
    comparing the first and second text streams; and
    selecting a predetermined one of the first and second text streams as the third text stream if the first and second text streams compare.

8. A method for detecting errors in a speech transmission system, the method comprising:
    receiving a first audio stream comprised of a plurality of words;
    performing a plurality of independent voice-to-text conversions of the audio;
    determining if at least one of the plurality of independent voice-to-text conversions is error free;
    performing a text-to-voice conversion of the at least one error-free voice-to-text conversion to create a second audio stream;
    replacing non-recognizable words in the first voice-to-text conversion with a first error code to produce a first text steam;
    replacing non-recognizable words in the second voice-to-text conversion with a second error code to produce a second text steam;
    comparing the first text stream with the second text stream;
    selecting one of the first text stream and the second text stream as a third text stream for conversion to voice; and
    producing the third text stream having a third error code at locations corresponding to at least one of the first error code in the first text stream and the second error code in the second text stream.

9. A method for detecting errors in a speech transmission system, the method comprising:
    receiving a first audio stream comprised of a plurality of words;
    performing a plurality of independent voice-to-text conversions of the audio;
    determining if at least one of the plurality of independent voice-to-text conversions is error free;
    performing a text-to-voice conversion of the at least one error-free voice-to-text conversion to create a second audio stream;
    replacing non-recognizable words in the first voice-to-text conversion with a first error code to produce a first text steam;
    replacing non-recognizable words in the second voice-to-text conversion with a second error code to produce a second text steam;
    comparing the first text stream with the second text stream;
    selecting one of the first text stream and the second text stream as a third text stream for conversion to voice; and
    wherein the first and second error codes are generated at the same location in the first and second text streams, respectively, and further comprising producing the third text stream having a third error code at the same location as the first and second error codes.

* * * * *